(12) United States Patent
Sassin et al.

(10) Patent No.: US 9,105,402 B2
(45) Date of Patent: *Aug. 11, 2015

(54) COMPOSITE ELECTRODE STRUCTURE (71) Applicants: Megan B. Sassin, Alexandria, VA (US);
Jeffrey W. Long, Alexandria, VA (US);
Debra R. Rolison, Arlington, VA (US)

(72) Inventors: Megan B. Sassin, Alexandria, VA (US);
Jeffrey W. Long, Alexandria, VA (US);
Debra R. Rolison, Arlington, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/572,365

(22) Filed: Dec. 16, 2014

(65) Prior Publication Data

US 2015/0103471 A1 Apr. 16, 2015

Related U.S. Application Data

(62) Division of application No. 12/644,604, filed on Dec. 22, 2009, now Pat. No. 9,058,931.

(60) Provisional application No. 61/143,903, filed on Jan. 12, 2009.

(51) Int. Cl.
*H01G 9/042* (2006.01)
*H01G 9/048* (2006.01)
*H01G 9/145* (2006.01)
*H01M 4/133* (2010.01)
*H01M 4/1393* (2010.01)
*H01M 4/583* (2010.01)
*H01M 10/0525* (2010.01)

(52) U.S. Cl.
CPC .............. *H01G 9/042* (2013.01); *H01G 9/048* (2013.01); *H01G 9/145* (2013.01); *H01M 4/133* (2013.01); *H01M 4/1393* (2013.01); *H01M 4/583* (2013.01); *H01M 10/0525* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 2002/0141964 | A1* | 10/2002 | Patterson et al. | 424/78.1 |
| 2007/0048614 | A1* | 3/2007 | Long et al. | 429/245 |
| 2008/0248192 | A1* | 10/2008 | Long et al. | 427/80 |
| 2009/0185327 | A1* | 7/2009 | Seymour | 361/500 |

* cited by examiner

*Primary Examiner* — Barbara Gilliam
*Assistant Examiner* — Adam A Arciero
(74) *Attorney, Agent, or Firm* — US Naval Research Laboratory; Stephen T. Hunnius (57) ABSTRACT

A method of storing charge comprising the steps of providing a capacitor comprising an anode, a cathode, and an electrolyte, wherein the electrolyte comprises a nonaqueous liquid of sufficient dielectric constant to dissociate salts soluble in the nonaqueous liquid, a composite comprising a prefabricated porous carbon electrode structure or a carbon foam substrate that is a prefabricated paper structure and a coating deposited by infiltrating the structure with iron oxide via self-limiting electroless deposition on the surface.

10 Claims, 6 Drawing Sheets

COMPOSITE ELECTRODE STRUCTURE

This application claims priority to U.S. patent application Ser. No. 61/143,903 filed Jan. 12, 2009 and U.S. patent application Ser. No. 12/644,604 filed on Dec. 22, 2009, the entirety of each are herein incorporated by reference.

Multifunctional electrode structures comprising nanoscale coatings of electroactive iron oxide (FeOx) on pre-formed, ultraporous, electrically conductive carbon nanoarchitectures (e.g., nanofoams and aerogels) are synthesized for use in high-performance electrochemical capacitors and batteries. Conformal FeOx coatings are produced by reacting an Fe-containing oxidant, such as $K_2FeO_4$, under self-limiting deposition conditions in aqueous media with the interior and exterior surfaces of the carbon nanoarchitecture. The redox reactions at the resulting nanoscale FeOx coating significantly increase the energy-storage capacity of the FeOx-carbon nanoarchitecture hybrid electrodes, while the supporting carbon nanoarchitecture establishes long-range electron conduction to the electroactive FeOx domains.

Mixed ion/electron-conducting transition metal oxides dominate the landscape of active materials for electrical energy storage in secondary (i.e., rechargeable) batteries, such as Li-ion batteries, and are also being successfully adapted for use in electrochemical capacitors, also known as "supercapacitors" or "ultracapacitors". Oxides of nickel, cobalt, manganese, and mixed oxides thereof, are the most common materials used in Li-ion battery cathodes, while hydrous ruthenium oxides are state-of-the-art electrode materials for electrochemical capacitors (ECs). Although these classes of metal oxides are well-established for electrochemical energy-storage applications, the development of new active materials continues, with an emphasis on achieving enhanced stability, charge-storage capacity, and/or high-voltage operation. The costs, monetary and strategic, and the environmental impact of state-of-the-art battery/EC oxides based on nickel, cobalt, and ruthenium oxides are also driving the search for alternative materials.

Iron oxides are a class of materials that are potentially advantageous for energy-storage applications due to their low cost and low toxicity. Although iron oxides have not been as extensively studied for batteries and ECs as other metal oxides, recent work has demonstrated that certain forms of nanoscale iron oxides can be used as both the active cathode and anode material for Li-ion batteries, and also as an anode material for aqueous asymmetric ECs.

The electrochemical performance of conventional forms of iron oxide is not yet competitive with current commercialized electrode materials, but significant improvements in charge-storage capacity can be achieved when the FeOx is synthesized in high-surface-area, nanoscale forms.

The electrochemical properties of nanoscale iron oxides may be further enhanced by distributing them on high-surface-area, electrically conductive carbon substrates.

For example, "co-precipitated" FeOx-carbon materials via sol-gel reaction from Fe precursors can be prepared in the presence of carbon black powder, and demonstrated high specific capacitance, 510 F $g^{-1}$, normalized to the FeOx content, but only at low oxide weight loadings. Note that in this protocol, the particulate carbon (the high electronic conductor) is coated by a vastly poorer electronic conductor (FeOx). In order to process this nanocomposite into a device-ready electrode structure, additional conductive powder (usually carbon black powder) as well as a polymer binder must be blended with the nanocomposite to form a usably conductive mixture.

Figure 1:
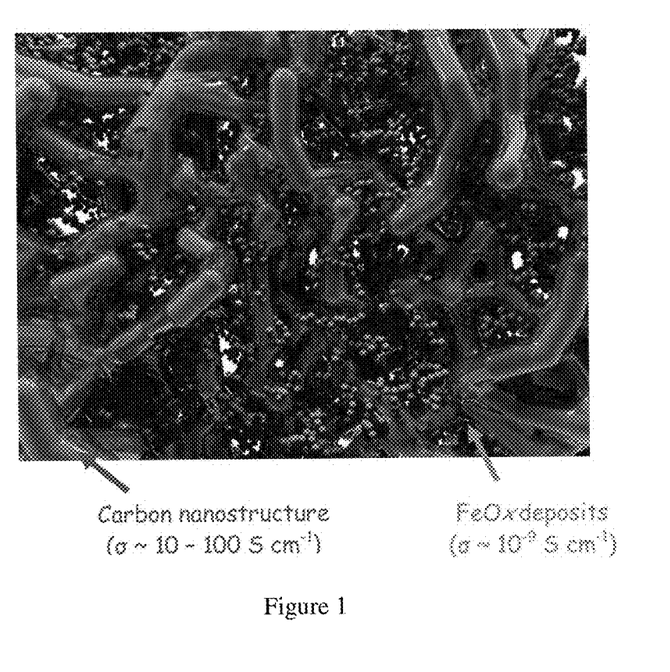
FIG. 1 is a schematic of a hybrid electrode structure comprising a highly porous carbon nanostructure in which the walls are coated with nanoscopic FeOx deposits. Note the distinction in the typical electrical conductivities (σ) of the carbon and FeOx components.

It is suggested that the performance limitations of iron oxides for electrochemical capacitors and batteries can be addressed with a hybrid electrode design, in which discrete nanoscale coatings or deposits of FeOx are incorporated onto/into ultraporous, high-surface-area carbon structures, e.g., aerogels, nanofoams, templated mesoporous/macroporous carbon, carbon nanotube assemblies, as illustrated in FIG. 1.

In such a configuration, long-range electronic conduction is facilitated through the carbon backbone and solid-state transport distances for ions through the FeOx phase are minimized by maintaining a nanoscopic carbon ||FeOx|| electrolyte interface.

We recently demonstrated an example of such a hybrid metal-oxide-carbon nanoarchitecture, using an electroless deposition process based on the decomposition of aqueous permanganate, to incorporate conformal 10- to 20-nm-thick $MnO_2$ coatings that extend throughout the macroscopic (~170-μm) thickness of carbon-paper-supported nanofoam structures. Our preliminary electrochemical experiments in mild aqueous electrolytes demonstrated that the pseudocapacitance of the nanoscopic $MnO_2$ coating at least doubles the specific capacitance of carbon nanofoams, while the volumetric capacitance is increased by more than a factor of 4. Extremely high footprint-normalized capacitances, >2.1 F $cm^{-2}$, are also achieved with such $MnO_2$-carbon structures, a consequence of the three-dimensional design of the carbon nanofoam substrate supporting the electroactive $MnO_2$ coating.

Herein, an electroless deposition process is described in which we use the redox reaction of potassium ferrate ($K_2FeO_4$), a strong oxidizer, with ultraporous carbon substrates to generate nanoscale conformal FeOx coatings on and throughout the carbon nanoarchitecture.

In the present case, the use of pre-formed carbon nanoarchitectures with macroscopic dimensions presents new challenges for achieving homogeneous FeOx deposition throughout the electrode structure, while preserving the native pore structure of the carbon template. A high-quality pore structure in the active electrode is vital for high-rate operation batteries and ECs because it facilitates electrolyte infiltration and ion transport to the internal charge-storing electrode/electrolyte interfaces.

We have previously demonstrated that by using self-limiting deposition methods, ranging from the electrodeposition of arylamine-based redox polymer coatings to the aforementioned electroless deposition of nanoscale $MnO_2$, one is able to incorporate homogeneous, conformal, nanoscale coatings of electroactive moieties onto carbon nanoarchitectures, while preserving a through-connected pore structure in the resulting hybrid electrode.

We now use a self-limiting deposition approach to the electroless deposition of nanoscale FeOx such that the $K_2FeO_4$ precursor only reacts with the surface of the carbon nanoarchitecture until the surface is passivated to further reaction with the precursor by the formation of a nanoscale FeOx coating. Careful control of the solution pH also minimizes extraneous reactions of the $K_2FeO_4$ precursor.

The result is a homogenous, nanoscale coating of a disordered iron oxide that permeates the pre-formed carbon nanoarchitecture electrode. The disordered, as-deposited FeOx coating can be subsequently converted by thermal processing to various nanocrystalline forms (e.g., $Fe_3O_4$, alpha-$Fe_2O_3$, or gamma-$Fe_2O_3$), each of which should exhibit distinct electrochemical properties for various battery and EC applications.

We present electrochemical data that demonstrate that the FeOx redox reactions significantly increase the charge-storage capacity of the resulting hybrid electrode structure relative to the native carbon nanoarchitecture, and do so at the high charge-discharge rates that are relevant for next-generation, high-performance batteries and electrochemical capacitors.

Carbon nanofoam papers were either purchased from a commercial source (MarkeTech, Int.) or prepared in-house using methods disclosed. Potassium ferrate ($K_2FeO_4$) was either purchased or synthesized in-house using published methods.

Electroless deposition of FeOx on carbon nanofoams. We used a strategy to synthesize FeOx-carbon nanoarchitecture hybrids, based on the decomposition of ferrate salts, in this case $K_2FeO_4$, from aqueous solutions, where the carbon nanoarchitecture surface serves as a sacrificial reductant that converts the aqueous ferrate to surface-sited insoluble FeOx. In a typical synthesis, carbon nanofoam substrates, 50- to 170-μm-thick, were first wetted in an aqueous solution of controlled pH by vacuum infiltration. The samples were then soaked in aqueous solutions of $K_2FeO_4$, typically 10 to 50 mM, of controlled pH, typically pH>14, for a period of time ranging from 30 min to 24 h. The FeOx-nanofoam papers were rinsed thoroughly with ultrapure water and subsequently dried at ~50° C. under $N_2$ for 8 h and then under vacuum overnight.

Although this protocol is attractive and straightforward, careful control of the ferrate reduction/decomposition reaction is required to achieve nanoscale FeOx deposits at the carbon surfaces throughout the carbon nanoarchitecture as well as to inhibit the formation of thick FeOx coatings on the exterior boundary of the carbon electrode. Preliminary results suggest that solution pH is a critical factor in determining the quality of the FeOx deposition, where the best results are achieved in strongly alkaline solutions, e.g., 9 M KOH, in which the $K_2FeO_4$ precursor is the most stable. Under such conditions, the $K_2FeO_4$ reacts in a self-limiting fashion with the exposed walls of the carbon substrate until those walls are coated and passivated with nanoscale FeOx deposits, and autocatalytic decomposition of the ferrate ion in solution or at the exterior of the carbon substrate is minimized.

Figure 2:
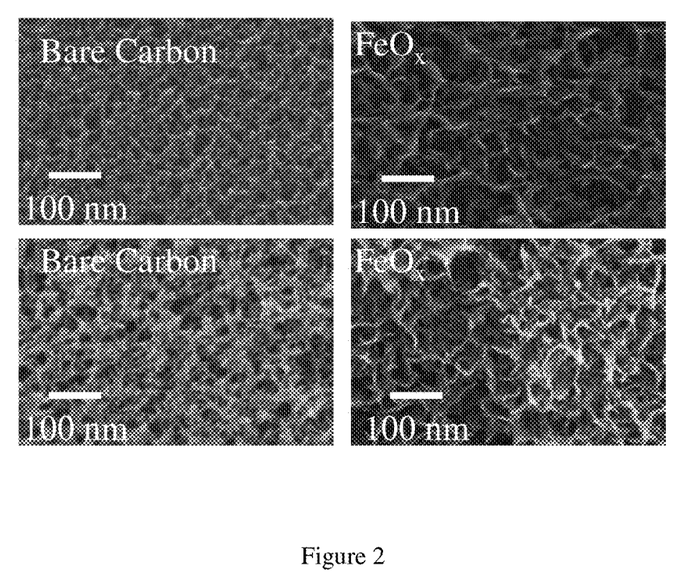
FIG. 2 includes scanning electron micrographs of a bare carbon nanofoam and a FeOx-coated carbon nanofoam. The top images are of the exterior of the nanofoams and the bottom images are of the interior of the nanofoams.

As shown in FIG. 2, under strongly alkaline deposition conditions, this electroless deposition process results in conformal FeOx deposits that permeate the macroscopic thickness of the carbon nanofoam substrate. Using this method, a weight gain of at least 30% is attained for a 20-h deposition. The SEM analysis further confirmed that the porous texture of the initial carbon nanofoam is largely retained following FeOx deposition, FIG. 2. Retention of the nanofoam's high-quality pore structure results in better electrochemical performance under high-rate charge-discharge operation.

Figure 3:
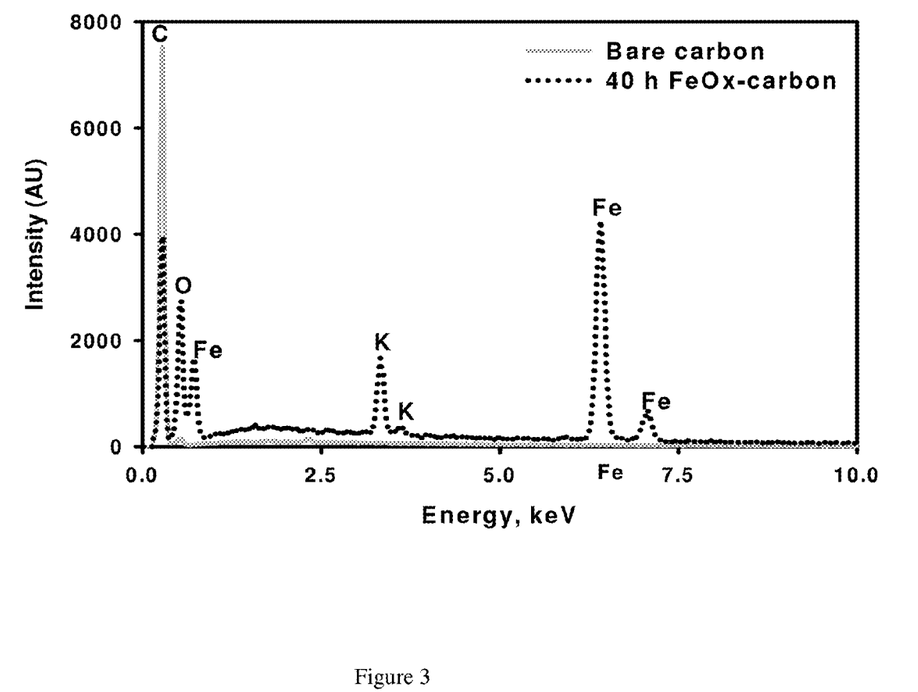
FIG. 3 shows energy dispersive spectroscopy of a cross-section of an FeOx-coated carbon nanofoam, demonstrating the presence of iron oxide following the electroless deposition procedure. The cross-section was created using a freeze-fracture method.

Energy-dispersive spectroscopy was used to confirm the presence of FeOx deposits on the walls of the interior of the nanofoam, as shown in FIG. 3.

We note that using aqueous $K_2FeO_4$ to oxidize graphite powders in an effort to improve the electrochemical properties of the graphite for Li-ion batteries has been reported, but in that case the resulting iron oxide coatings were deliberately removed by treatment with dilute acid prior to electrochemical evaluation of the resulting material. The improved performance of the ferrate-treated graphite was attributed to oxidation of the graphite surface, which increased the inherent Li-ion-intercalation capacity of the graphite. For the invention described herein, the incorporated FeOx coating itself serves as the active charge-storage phase, while the supporting carbon nanoarchitecture simply, but critically serves as the 3-D current collector.

Electrochemical Characterization of Hybrid Structures in Aqueous Electrolytes.

The FeOx-nanofoam electrodes were wetted for electrochemical analysis with 2.5 M $Li_2SO_4$ using vacuum infiltration. The electrodes were characterized in a conventional 3-electrode electrochemical cell using techniques such as cyclic voltammetry, impedance spectroscopy, and galvanostatic charge-discharge measurements.

Table 1 presents the specific, geometric, and volumetric capacitance values calculated from the voltammetric data (range: 200 to −700 mV versus Ag/AgCl) measured at a scan rate of 5 mV s$^{-1}$.

Figure 4:
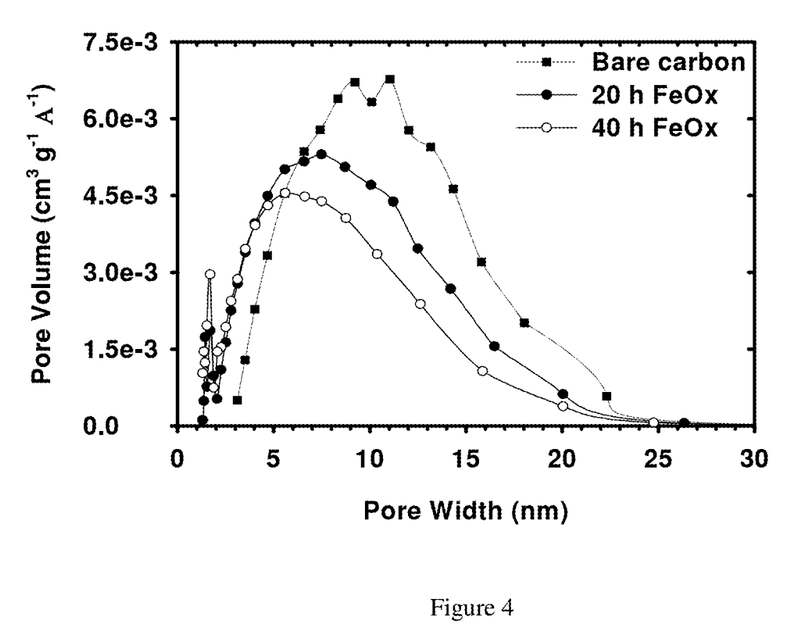
FIG. 4 is a pore-size distribution plot derived from nitrogen-sorption porosimetry measurements, showing a narrowing of the pores of the carbon nanofoam after incorporation of the FeOx coatings, but with retention of a through-connected pore structure.
Figure 5:
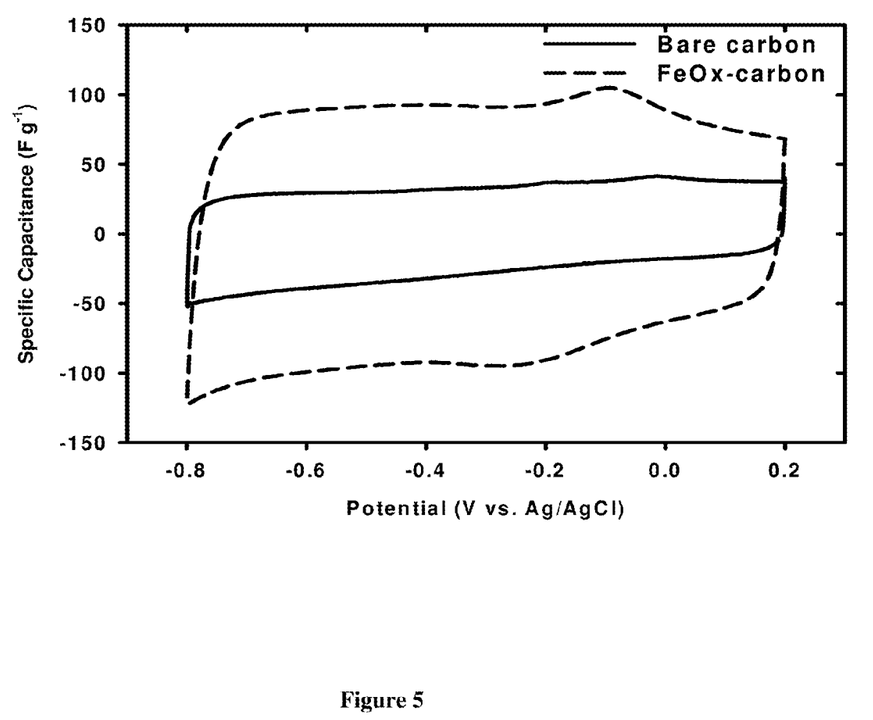
FIG. 5 illustrates specific capacitance versus potential for a bare carbon nanofoam and a FeOx-coated carbon nanofoam in aqueous 2.5 M $Li_2SO_4$ at a voltammetric scan rate of 5 mV/s.

The specific capacitance versus potential for a bare carbon nanofoam and an FeOx-coated carbon nanofoam demonstrates the improved capacitive properties of the coated nanofoam, FIG. 4.

The capacitance values, specific and volumetric, for all FeOx-nanofoam samples are at least 2-fold higher than the bare carbon nanofoam. The estimated FeOx-specific capacitance attributable to the FeOx component, at a mass loading of 30%, is also presented.

TABLE 1

Capacitance values for a bare carbon nanofoam and a FeOx-coated carbon nanofoam.

|  | Specific Capacitance (F/g$_{Total}$) | FeOx-Specific Capacitance (F/g$_{FeOx}$) | Geometric Capacitance (F/cm$^2$) | Volumetric Capacitance (F/cm$^3$) |
| --- | --- | --- | --- | --- |
| Carbon nanofoam | 29 | N/A | 0.15 | 21 |
| FeOx-carbon nanofoam | 84 | 315 | 0.85 | 121 |

The electroless deposition described herein is a cost-effective and scaleable approach for synthesizing FeOx-carbon hybrid nanoarchitectures with electrochemical charge-storage characteristics that are superior to unmodified carbon substrates.

Our work demonstrates that by controlling solution pH (typically using strongly alkaline solutions) during the deposition process, homogenous, nanoscale FeOx deposits are achieved throughout macroscopically thick, pre-formed carbon electrode substrates. The benefits of homogenous FeOx deposition are evident when such structures are electrochemically analyzed.

For example, FeOx-carbon hybrids exhibit higher overall specific and geometric capacitance.

Uniform deposition within the interior of the carbon nanoarchitecture also results in greater enhancement when the volumetric capacitance is considered, as the addition of the FeOx component contributes additional capacitance without increasing the bulk volume of the electrode structure.

For example, with a carbon nanofoam coated under strongly alkaline conditions the specific capacitance is increased by a factor of at least 3, while the volumetric capacitance is increased by a factor of at least 7.

Figure 6:
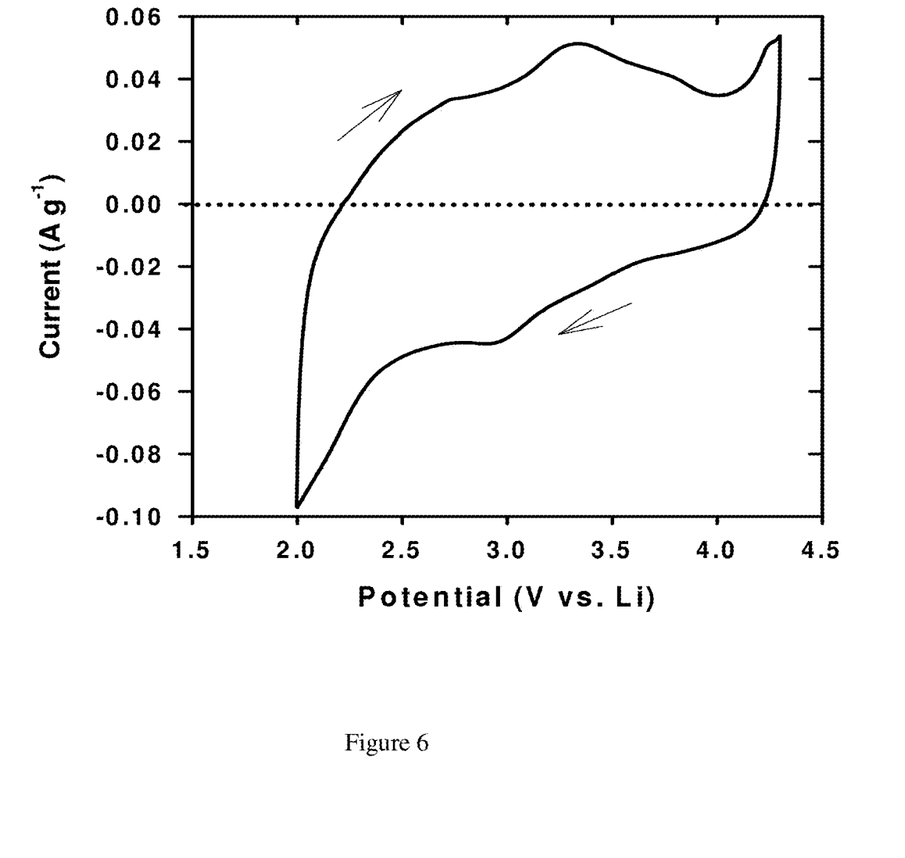
FIG. 6 is a cyclic voltammogram for an FeOx-carbon nanofoam electrode that is cycled in a nonaqueous Li-ion electrolyte (1 M $LiPF_6$ in ethylene carbonate:diethylcarbonate), scanning at 0.1 mV/s.

The FeOx-carbon hybrid nanoarchitectures produced by this electroless deposition method also exhibit enhanced charge-storage capacity when electrochemically cycled in nonaqueous electrolytes that are commonly used in Li-ion batteries, as shown in FIG. 6. Preliminary experiments indicate that the Li-ion capacity of the FeOx coating in such structures is >200 mAh/g.

Even greater enhancements can be predicted in electrochemical performance for these hybrids with further optimization of the electroless deposition conditions and also by varying the carbon template pore structure, particularly targeting larger pore sizes (100-200 nm) and higher overall porosity, which should result in higher mass loadings of FeOx. In one embodiment, the attainable mass loading is 30% for a 20-h deposition.

The above description is that of a preferred embodiment of the invention. Various modifications and variations are possible in light of the above teachings. It is therefore to be understood that, within the scope of the appended claims, the invention may be practiced otherwise than as specifically described. Any reference to claim elements in the singular, e.g. using the articles "a," "an," "the," or "said" is not construed as limiting the element to the singular.

What is claimed is:

1. A method of storing charge comprising the steps of:
providing a capacitor comprising an anode, a cathode, and an electrolyte, wherein the electrolyte comprises a nonaqueous liquid to dissociate salts soluble in the nonaqueous liquid, and wherein the anode, the cathode, or both comprise: a composite comprising a prefabricated porous carbon electrode structure or a carbon foam substrate that is a prefabricated paper structure comprising a surface and pores wherein the pores have an average diameter that ranges from about 2 nm to about 1 μm; and a coating deposited by infiltrating the structure with iron oxide via self-limiting electroless deposition on the surface; wherein the coating does not completely fill the pores; wherein the coating comprising iron oxide covers the interior and exterior surfaces of the porous carbon electrode structure and is continuous over the surface and is deposited in a homogenous form and is evenly distributed throughout the thickness of the carbon foam substrate that is a prefabricated paper;
wherein the modifying coating of iron oxide is achieved by infiltrating the prefabricated porous carbon electrode structure that is a macroscopically thick monolithic porous electrode structure of greater than about 5 μm with an aqueous $K_2FeO_4$ solution such that the iron-based oxidant reacts with the surface of the oxidizable electrode structure to ensure self-limiting deposition of the iron oxide as an ultrathin coating of less than about 50 nm distributed commensurately over the internal and external surfaces throughout the entirety of the macroscopically thick monolithic porous electrode structure and inherent conductive electrode scaffold;
wherein the coating has a thickness of less than about 50 nm; wherein the prefabricated porous carbon electrode structure or carbon foam substrate that is a prefabricated paper is used directly as an electrode without requiring additional conductive additives or binders to be processed into a device-suitable electrode; and a current collector in electrical contact with the composite; and charging the capacitor.

2. The method of claim 1, wherein a mass loading of iron oxide of about 30% is achieved and the specific capacitance is increased by a factor of about 3.

3. The method of claim 1, wherein the structure is a carbon aerogel.

4. The method of claim 1, wherein the structure is selected from the group consisting of carbon nanofoam, xerogel, templated mesoporous carbon, templated macroporous carbon, and carbon nanotube/nanofiber assemblies.

5. The method of claim 1, wherein the coating has a thickness of about 10 nm.

6. A method of storing charge comprising the steps of:
providing a capacitor comprising an anode, a cathode, and an electrolyte, wherein the electrolyte comprises a liquid selected from the group consisting of an aqueous, basic (pH>8) electrolyte, and wherein the anode, the cathode, or both comprise: a composite comprising a prefabricated porous carbon electrode structure or a carbon foam substrate that is a prefabricated paper structure comprising a surface and pores wherein the pores have an average diameter that ranges from about 2 nm to about 1 μm; and a coating deposited by infiltrating the structure with iron oxide via self-limiting electroless deposition on the surface; wherein the coating does not completely fill the pores; wherein the coating comprising iron oxide covers the interior and exterior surfaces of the porous carbon electrode structure and is continuous over the surface and is deposited in a homogenous form and is evenly distributed throughout the thickness of the carbon foam substrate that is a prefabricated paper;
wherein the modifying coating of iron oxide is achieved by infiltrating the prefabricated porous carbon electrode structure that is a macroscopically thick monolithic porous electrode structure of greater than about 5 μm with an aqueous $K_2FeO_4$ solution such that the iron-based oxidant reacts with the surface of the oxidizable electrode structure to ensure self-limiting deposition of the iron oxide as an ultrathin coating of less than about 50 nm distributed commensurately over the internal and external surfaces throughout the entirety of the macroscopically thick monolithic porous electrode structure and inherent conductive electrode scaffold;
wherein the coating has a thickness of less than about 50 nm; wherein the prefabricated porous carbon electrode structure or carbon foam substrate that is a prefabricated paper is used directly as an electrode without requiring additional conductive additives or binders to be processed into a device-suitable electrode; and a current collector in electrical contact with the composite; and charging the capacitor.

7. The method of claim 6, wherein a mass loading of iron oxide of about 30% is achieved and the specific capacitance is increased by a factor of about 3.

8. The method of claim 6, wherein the structure is a carbon aerogel.

9. The method of claim 6, wherein the structure is selected from the group consisting of carbon nanofoam, xerogel, templated mesoporous carbon, templated macroporous carbon, and carbon nanotube/nanofiber assemblies.

10. The method of claim 6, wherein the coating has a thickness of about 10 nm.

* * * * *